P. H. GUNDERMANN,
RUBBER BUMPER.
APPLICATION FILED NOV. 23, 1916.
1,233,051.
Patented July 10, 1917.
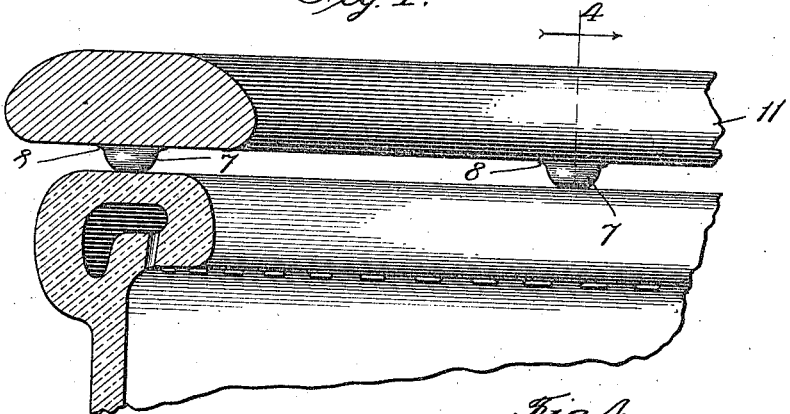
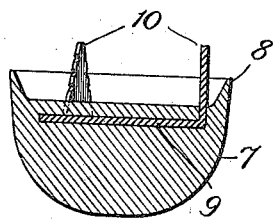
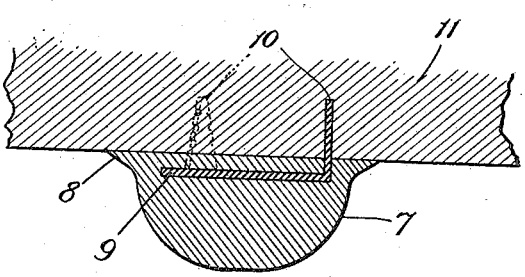
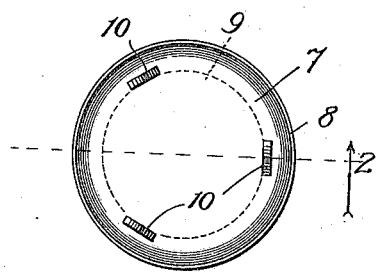
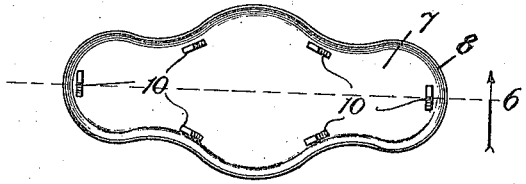
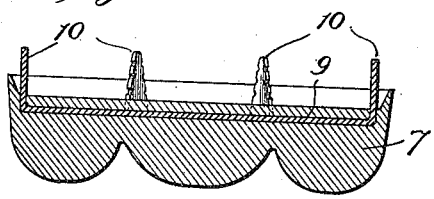
Witnesses:
Inventor:
Philip H. Gundermann,
By Dyrenforth, Lee, Chritton and Wiles
Attys

UNITED STATES PATENT OFFICE.

PHILIP H. GUNDERMANN, OF CHICAGO, ILLINOIS.

RUBBER BUMPER.

1,233,051.

Specification of Letters Patent.  Patented July 10, 1917.

Application filed November 23, 1916. Serial No. 133,057.

*To all whom it may concern:*

Be it known that I, PHILIP H. GUNDERMANN, a citizen of the United States, residing at Chicago, in the county of Cook and State of Illinois, have invented a new and useful Improvement in Rubber Bumpers, of which the following is a specification.

My invention relates to the class of bumpers, made of soft rubber, such as are commonly fastened, for their cushioning purposes, by screws to toilet seats and lids, though they are also used in other connections.

I have more immediately devised my improvement for use in the toilet-seat connection, referred to, and therefore direct the description hereinafter contained, particularly to that use, though I wish to be understood as intending to protect it in all connections in which it may be desirable to use it.

A soft-rubber button-like bumper now in quite general use on toilet seats contains a central opening through which a screw is inserted for fastening the bumper to the under face near the edge of the seat. A plurality of these bumpers are so fastened at intervals to cushion the blow, in dropping or slamming the seat, against the edge-portion of the more or less fragile closet-bowl. The head of the fastening screw is countersunk in the enlarged outer-end portion of the hole, leaving the outer section of the latter open and affording lodgment therein to impure and therefore unsanitary matter, besides exposing the screw to the atmosphere and the influence of acid fumes from the bowl, which tend to rot away the screw-head and thus loosen the bumper. Moreover, the bumper not infrequently becomes flattened and worn with use sufficiently to expose the head of the screw, whereby in slamming or dropping the seat the bare metal encounters the bowl and is liable to fracture it.
These and other objections are overcome by my improvement.

In the accompanying drawing, Figure 1 is a broken sectional view of a toilet having its seat provided with my improved bumpers;
Fig. 2 is a section of one of the bumpers, on line 2, Fig. 3; Fig. 3 is a bottom plan view of the bumper illustrated in Fig. 2; Fig. 4 is a section taken on line 4, Fig. 1, and enlarged; Fig. 5 is a bottom plan view of the bumper showing a modified form thereof, and Fig. 6 is a section on line 6, Fig. 5.

The bumper proper 7 is shown in Figs. 1 to 4, inclusive, in its preferred more usual button-like form. It is molded out of soft vulcanized rubber, but is devoid of the screw-opening hereinbefore referred to, and provided with an integral rubber skirt 8 about its inner edge. A thin-metal plate 9 is provided on the button, being secured thereto in any desired manner but preferably embedded therein near its inner flat back, as represented; and pointed prongs 10, in desired number, and which should be serrated along their edges, as shown, are formed at suitable intervals about the edge-portion of the metal plate, to project at the inner face of the bumper.

It is desirable to provide the present variety of bumper in a series of the buttons as well as singly. This serial form is illustrated in Figs. 5 and 6, which show three of the buttons molded together, the end buttons being somewhat narrower than the central one, the skirt 8 extending about the inner edge of the series, and the plate 9 conforming to the shape of the series, in which it is embedded and has its prongs 10 projecting at intervals about the inner button-face or back.

To fasten my improved bumper in place, it requires to be merely tapped with a hammer to drive the prongs into the wood of a toilet-seat 11, whereby the skirt 8, which may be beveled, as represented, to cause it to tend to spread outwardly in so driving the prongs, hugs the surface of the wood and effectively shields such projecting portions of the prongs as may not penetrate the wood, against access of fume-laden air. The serrated edges of the prongs serve to increase their hold in the wood against loosening.

As will be seen, the construction of my improved bumper renders its application to use a very simple operation, compared with the screw-fastened device, which requires the employment of a hammer and a screw-driver for fastening it in place; and there being no opening in the button, there is no depression or pocket for the lodgment therein of impure matter and no liability to metal being slammed against and fracturing the bowl; and the metal used for the fastening purpose is thoroughly shielded against oxidation, while the prongs are so slender that they do not mutilate the wood into which they are driven, though serving to securely fasten the bumper, they being integral with the edge of the plate 9, which adequately reinforces them.

What I claim as new and desire to secure by Letters Patent is:—

1. A rubber bumper provided with a skirt about the periphery of its contact-face, and a metal plate embedded in the rubber body and having prongs projecting from said face inside the skirt, to be embedded in a seat-bottom.

2. A rubber bumper comprising a series of molded buttons provided with a skirt about the periphery of its contact-face, and a metal plate embedded in the rubber body of said series and having prongs projecting from said face inside the skirt, to be embedded in a seat-bottom.

PHILIP H. GUNDERMANN.

Copies of this patent may be obtained for five cents each, by addressing the "Commissioner of Patents, Washington, D. C."